United States Patent
Luo

(10) Patent No.: US 11,199,291 B2
(45) Date of Patent: Dec. 14, 2021

(54) SPRING ADJUSTMENT SUPPORTING ARM FOR DISPLAY SUPPORT

(71) Applicants: Shanghai ThinkWise Industrial Co., Ltd, Shanghai (CN); Fujian Eternal Intelligent Technology Co., Ltd, Fujian (CN)

(72) Inventor: Chengyi Luo, Shanghai (CN)

(73) Assignees: Shanghai ThinkWise Industrial Co., Ltd, Shanghai (CN); Fujian Eternal Intelligent Technology Co., Ltd, Zhangzhou (CN)

( * ) Notice: Subject to any disclaimer, the term of this patent is extended or adjusted under 35 U.S.C. 154(b) by 126 days.

(21) Appl. No.: 16/712,825

(22) Filed: Dec. 12, 2019

(65) Prior Publication Data
US 2020/0116301 A1 Apr. 16, 2020

Related U.S. Application Data

(63) Continuation-in-part of application No. PCT/CN2018/085053, filed on Apr. 28, 2018.

(30) Foreign Application Priority Data

Jun. 29, 2017 (CN) .......................... 201720771078.2

(51) Int. Cl.
*F16M 13/02* (2006.01)
*F16M 11/20* (2006.01)
(Continued)

(52) U.S. Cl.
CPC ...... *F16M 13/022* (2013.01); *F16M 11/2035* (2013.01); *F16M 11/24* (2013.01);
(Continued)

(58) Field of Classification Search
CPC .. F16M 13/022; F16M 11/2035; F16M 11/24; F16M 2200/048; F16M 11/10; F16M 11/16; F16M 11/20
See application file for complete search history.

(56) References Cited

U.S. PATENT DOCUMENTS 1,864,756 A * 6/1932 Pieper ..................... F21V 21/26
248/568
4,082,244 A * 4/1978 Groff ..................... A61G 15/16
248/280.11
(Continued)

FOREIGN PATENT DOCUMENTS

| CN | 202746864 U | 2/2013 |
|---|---|---|
| CN | 103335195 A | 10/2013 |
| CN | 107420707 A | 12/2017 |

OTHER PUBLICATIONS

International Search Report of PCT Patent Application No. PCT/CN2018/085053 dated Aug. 2, 2018.

*Primary Examiner* — Tan Le

(57) ABSTRACT

Disclosed is a spring adjustment supporting arm for a display support. The supporting arm comprises an upright column, a big supporting arm, a medium supporting arm and a supporting arm brace rod. The upright column, the big supporting arm, the medium supporting arm and the supporting arm brace rod are hinged to form a four-bar linkage. The big supporting arm is internally provided with a cavity, and the cavity is internally provided with a spring assembly. It is not necessary to adapt to the weight of a display by means of adjusting a force arm included angle of the spring assembly, and therefore, it is not necessary to arrange a force arm included angle adjustment mechanism, thus simplifying a mechanism of the supporting arm, improving the reliabil-
(Continued)

ity of production and mounting, reducing production costs, prolonging the service life of a product and preventing potential safety hazards.

16 Claims, 8 Drawing Sheets

(51) Int. Cl.
*F16M 11/24* (2006.01)
*F16M 11/10* (2006.01)
*F16M 11/16* (2006.01)

(52) U.S. Cl.
CPC .............. *F16M 11/10* (2013.01); *F16M 11/16* (2013.01); *F16M 11/20* (2013.01); *F16M 2200/041* (2013.01); *F16M 2200/048* (2013.01)

(56) References Cited

U.S. PATENT DOCUMENTS

| | | | | |
|---|---|---|---|---|
| 7,510,155 | B2* | 3/2009 | Huang | F16M 11/10 248/278.1 |
| 9,004,431 | B2* | 4/2015 | Huang | F16M 11/2014 248/282.1 |
| 9,759,371 | B2* | 9/2017 | Borloz | F16M 11/24 |
| 2008/0029670 | A1* | 2/2008 | Hung | F16M 11/041 248/278.1 |
| 2010/0327129 | A1* | 12/2010 | Chen | F16M 11/2092 248/121 |

* cited by examiner

SPRING ADJUSTMENT SUPPORTING ARM FOR DISPLAY SUPPORT

CROSS REFERENCE TO RELATED APPLICATIONS

The present application is a Continuation-In-Part Application of PCT Application No. PCT/CN2018/085053 filed on Apr. 28, 2018, which claims the benefit of Chinese Patent Application No. 201720771078.2 filed on Jun. 29, 2017. All the above are hereby incorporated by reference.

FIELD OF THE INVENTION

The application relates to the technical field of display supports, in particular to a spring adjustment supporting arm for a display support.

BACKGROUND OF THE INVENTION

Featured by light weight and small volume, the flat panel display, especially LCD panel, almost replaces the traditional CRT displays and creates many new needs and applications. In order to meet different individual needs, the height, elevation and rotation of displays need to be adjusted. However, at present, supporting bases provided together with displays by the display manufacturers cannot realize multi-directional and multi-angle adjustment of the displays due to relatively single function. For this reason, some professional display manufacturers have been dedicated to development of many display supports allowing adjustment of the height, pitch angle and left-right rotation angle. At present, most of adjustable display supports adopt a four-bar linkage to allow the adjustment through swinging, and an elastic support assembly shall be arranged in the four-bar linkage to strengthen the support force of the supporting arm and fix the adjustment angle of the four-bar linkage at the same time. In the prior art, the elastic support assembly mostly takes a gas spring as a force storage mechanism. Since the elastic force from the gas spring is constant, when the display support is intended to support displays with different weights, it is necessary to adjust the included angle of the force arm of gas spring for adapting to these displays. Therefore, a force arm included angle adjustment mechanism of the gas spring is required and thus complicates the structure of the whole support; meanwhile, the gas spring has short service life and potential safety hazards in use, and is thus costly. In addition, the elastic support assemblies are all arranged in the range of four-bar linkage in the prior art. The four-bar linkage of the supporting arm is generally bulky and heavy for the purpose of accommodating the elastic support assemblies and allowing for a certain adjustment range; as a result, it is neither beautiful nor convenient to move. Those skilled in the art are committing themselves to solving the above technical defects.

SUMMARY OF THE INVENTION

In view of the above defects in the prior art, the purpose of the application is to provide a technical scheme for replacing the gas spring in the display support, thereby obtaining simpler structure, higher reliability and safety, longer life and lower cost.

In order to achieve the above technical purpose, the application provides a spring adjustment supporting arm for a display support. The supporting arm comprises an upright column, a big supporting arm, a medium supporting arm and a supporting arm brace rod, wherein the upright column, the big supporting arm, the medium supporting arm and the supporting arm brace rod are hinged to form a four-bar linkage, the big supporting arm is internally provided with a cavity, the cavity is internally provided with a spring assembly, one end of the spring assembly abuts against the top of the cavity, and the other end of the spring assembly is fixed to the upright column in a hinged manner by means of a connecting rod.

Further, the lines formed by sequentially connecting the connection point between the supporting arm brace rod and the upright column, the connection point between the supporting arm brace rod and the medium supporting arm, the connection point between the big supporting arm and the medium supporting arm, and the connection point between the big supporting arm and the upright column form a parallelogram.

Further, the spring assembly comprises a spring pressing mechanism, a spring and a spring fixing mechanism; one end of the spring pressing mechanism abuts against the top of the cavity, and the other end thereof presses the front end of the spring towards the spring fixing mechanism; the spring fixing mechanism is arranged at the rear end of the spring, the rear end of the spring is fixed to the spring fixing mechanism, and the spring fixing mechanism is hinged and fixed to the upright column through a connecting rod.

Further, an adjusting window is arranged at the front part of the bottom of the big supporting arm, an adjusting hole is arranged at the top of the cavity, the inner opening of the adjusting hole is communicated with the cavity, and the outer opening thereof is communicated with the adjusting window; the spring pressing mechanism comprises an adjusting screw and an adjusting nut; the adjusting screw has an adjusting end with an inner hexagonal structure, an adjusting end step is arranged below the adjusting end sleeved in the adjusting hole, and abuts against the top wall of the cavity around the inner opening of the adjusting hole; the adjusting screw is provided with external threads, the adjusting nut is sleeved outside the adjusting screw through threaded connection, and the front end of the spring is sleeved on the adjusting screw below the adjusting nut; the spring fixing mechanism is a spring support, one end of the spring support is provided with a connecting rod seat, the rear end of the spring is sleeved on the spring support and abuts against the connecting rod seat, the connecting rod seat is pin jointed to one end of the connecting rod, and the other end of the connecting rod is pin-jointed to the upright column.

Further, the spring support is hollow and tubular, the outer diameter of the adjusting screw is smaller than the tubular inner diameter of the spring support, the sum of the lengths of the adjusting screw and the spring support is larger than the maximum length when the spring is completely relaxed, and the lower end of the adjusting screw is sleeved inside the spring support to form a spring guide shaft which completely passes through the inside of the spring.

Further, the adjusting screw comprises a threaded section and a smooth section, wherein the threaded section is provided with external threads; the outer diameter of the smooth section of the adjusting screw is smaller than the inner diameter of the hollow spring support, and the outer diameter of the bottom end of the threaded section of the adjusting screw is larger than the inner diameter of the hollow spring support; the length of the smooth section of the adjusting screw is smaller than that of the spring support; the smooth section of the adjusting screw is sleeved inside the spring support to form a spring guide shaft which completely passes through the inside of the spring.

Further, an end face bearing is arranged between the adjusting end step and the top wall of the cavity.

Further, the upright column is provided with a connection part between the upright column and the supporting arm brace rod and a connection part between the upright column and the big supporting arm, and the medium supporting arm is provided with a connection part between the medium supporting arm and the supporting arm brace rod and a connection part between the medium supporting arm and the big supporting arm; one end of the supporting arm brace rod is pin jointed to the connection part between the upright column and the supporting arm brace rod, and the other end thereof is pin-jointed to the connection part between the medium supporting arm and the supporting arm brace rod; the front end of the big supporting arm is pin jointed to the connection part between the medium supporting arm and the big supporting arm, and the rear end of thereof is pin jointed to the connection part between the upright column and the big supporting arm.

Further, a tube for holding wires is arranged under the big supporting arm.

Further, a step for avoidance is arranged on the surface of the upright column.

Further, a contact point between one end of the spring assembly and the top of the cavity, a hinge point of the other end of thereof and the connecting rod, and a hinge point of the connecting rod and the upright column are all located outside the parallelogram.

Further, a sliding mechanism is arranged between the hinge point of the spring assembly and the connecting rod and the inner wall of the big supporting arm, so that the hinge point of the spring assembly and the connecting rod slides along the inner wall of the big supporting arm when the supporting arm is swinging.

Further, the sliding mechanism comprises a chute arranged on the inner wall of the big supporting arm and balls arranged at the hinge point of the spring assembly and the connecting rod, the chute is matched with the balls to enable the hinge point of the spring assembly and the connecting rod to slide along the inner wall of the big supporting arm when the supporting arm is swinging. The included angle between the center line of the chute and the axis of the big supporting arm is 0-5°.

Or, the sliding mechanism comprises a guide rail arranged on the inner wall of the big supporting arm and a groove arranged at the hinge point of the spring assembly and the connecting rod, the guide rail is matched with the groove to enable the hinge point of the spring assembly and the connecting rod to slide along the inner wall of the big supporting arm when the supporting arm is swinging. The included angle between the center line of the guide rail and the axis of the big supporting arm is 0-5°.

The beneficial effects of the application are as follows: a mechanical spring assembly is used instead of a gas spring assembly as a force storage mechanism of an elastic supporting mechanism of the supporting arm for the display support. It is not necessary to adapt to the weight of a display by means of adjusting a force arm included angle of the spring assembly, and therefore, it is not necessary to arrange a force arm included angle adjustment mechanism, thus simplifying a mechanism of the supporting arm, improving the reliability of production and mounting, reducing production costs, prolonging the service life of a product and preventing potential safety hazards.

Figure 1:
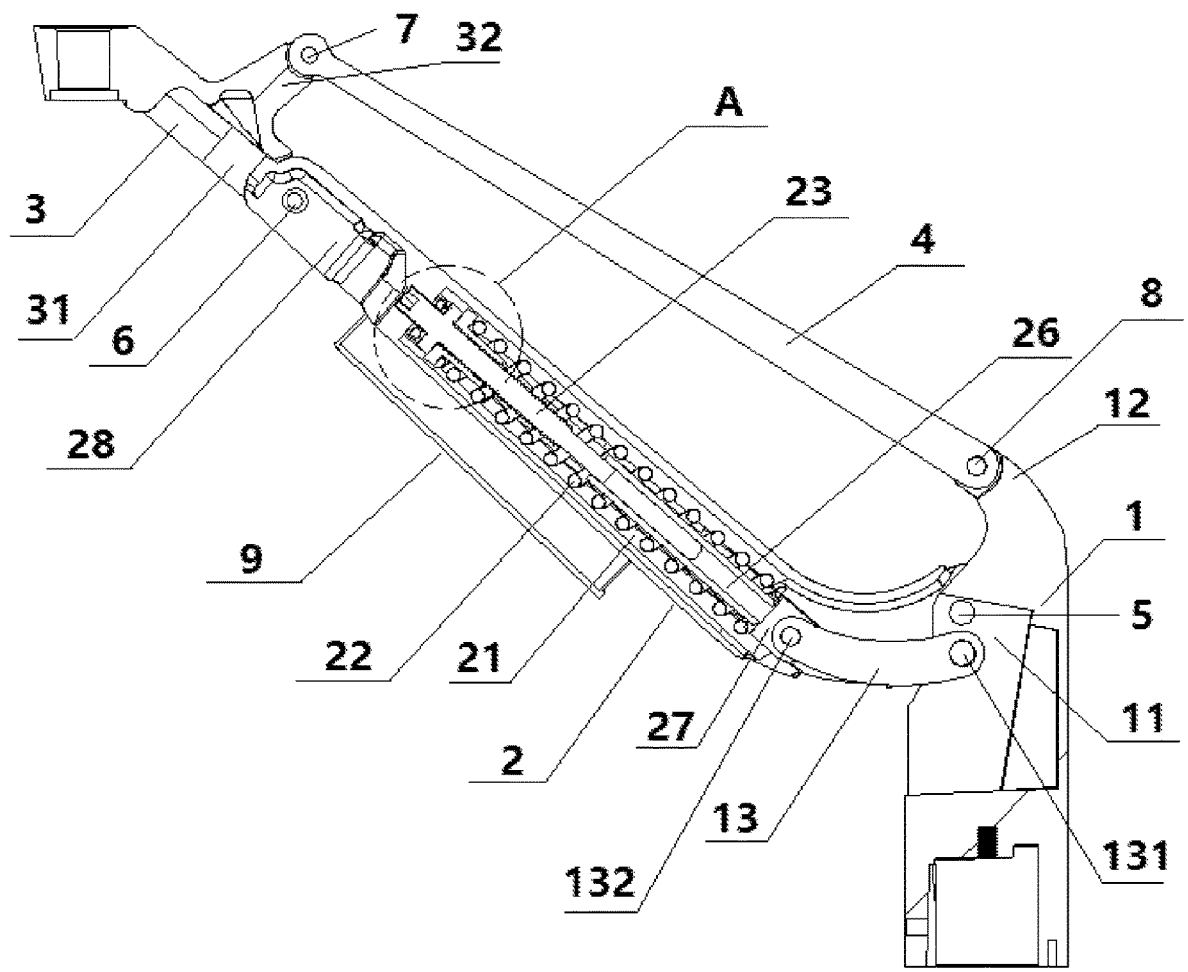
FIG. 1 is a sectional diagram of an embodiment of the application.
Figure 2:
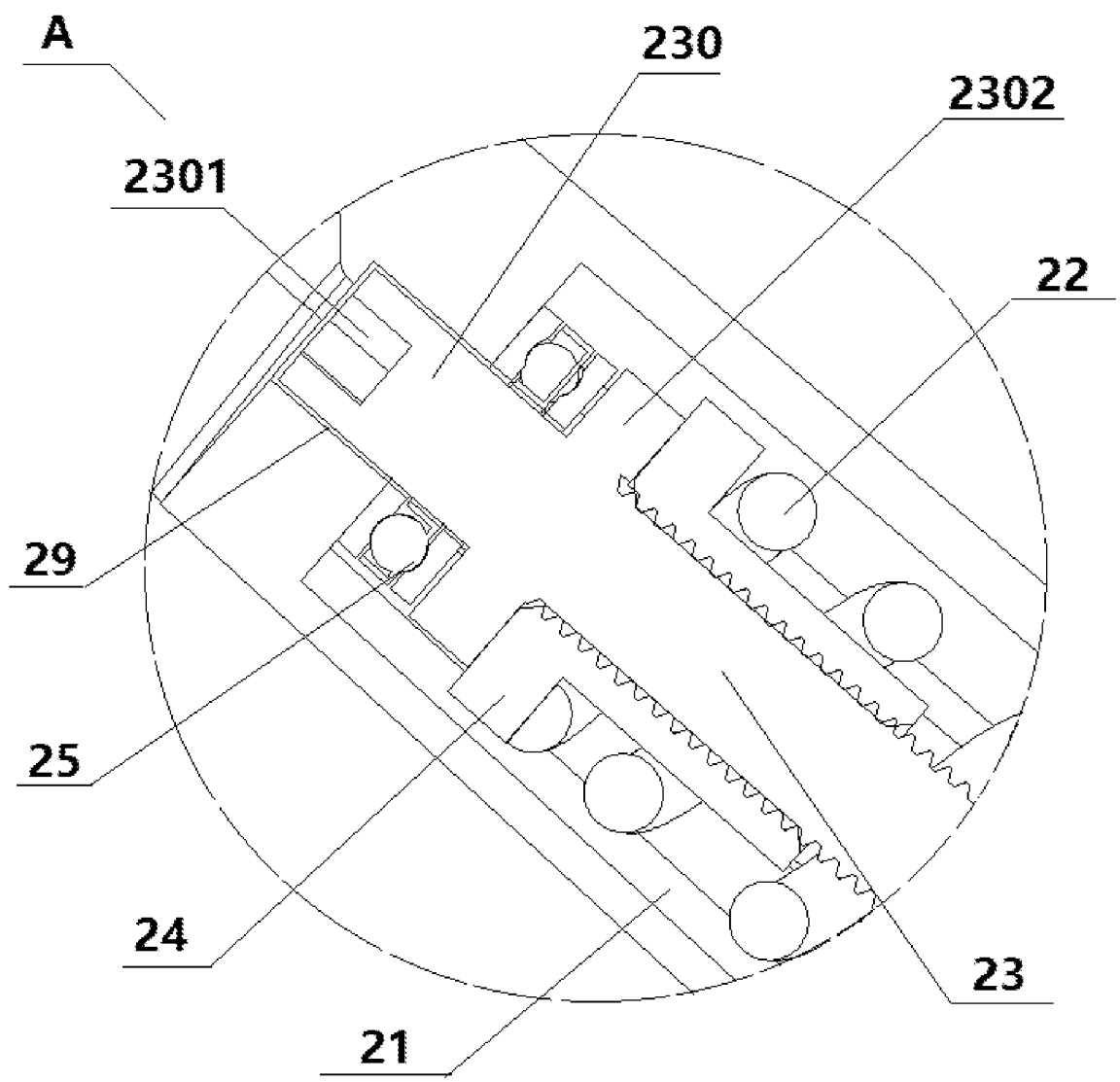
FIG. 2 is a partial enlarged view of part A in FIG. 1.
Figure 3:
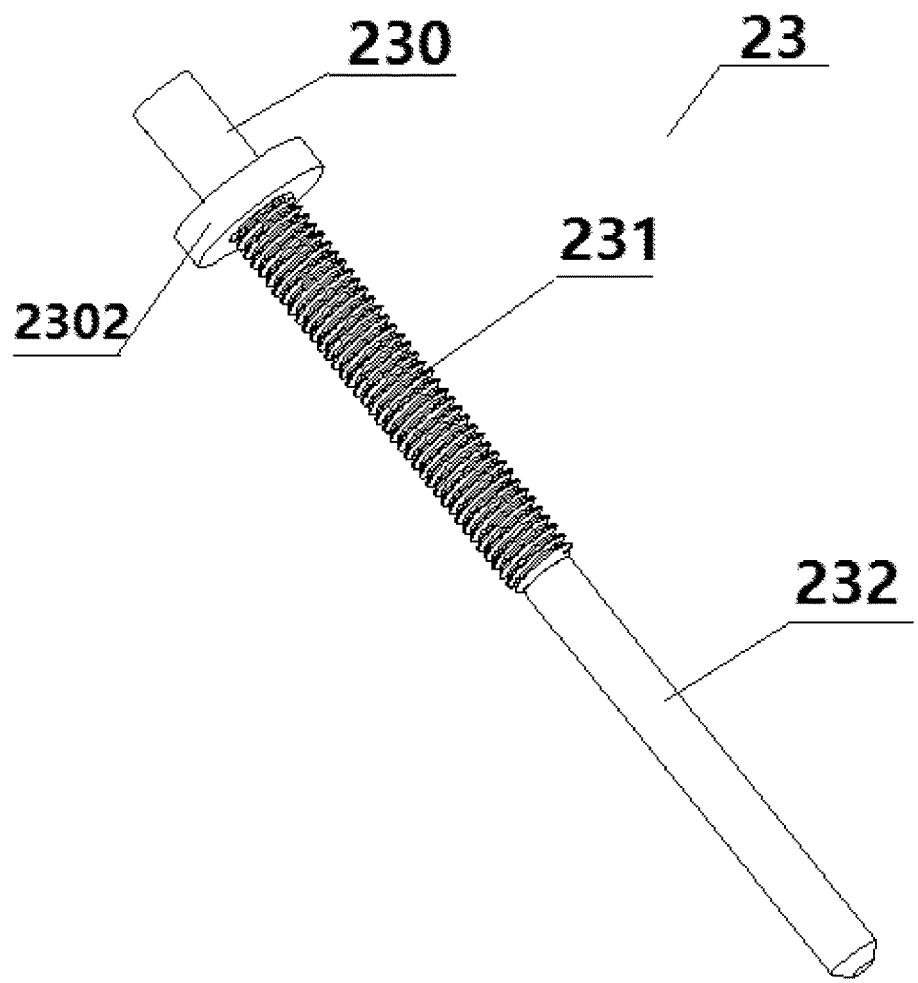
FIG. 3 is a structural diagram of an adjusting screw in the embodiment of the application.
Figure 4:
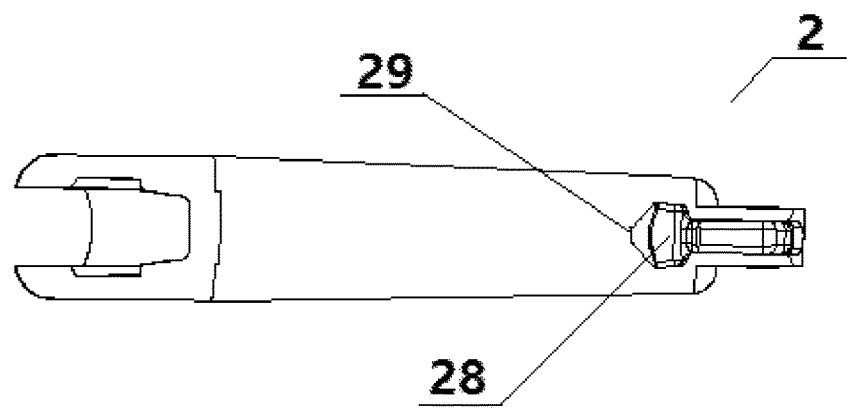
FIG. 4 is a bottom view of a big supporting arm in the embodiment of the application.
Figure 5:
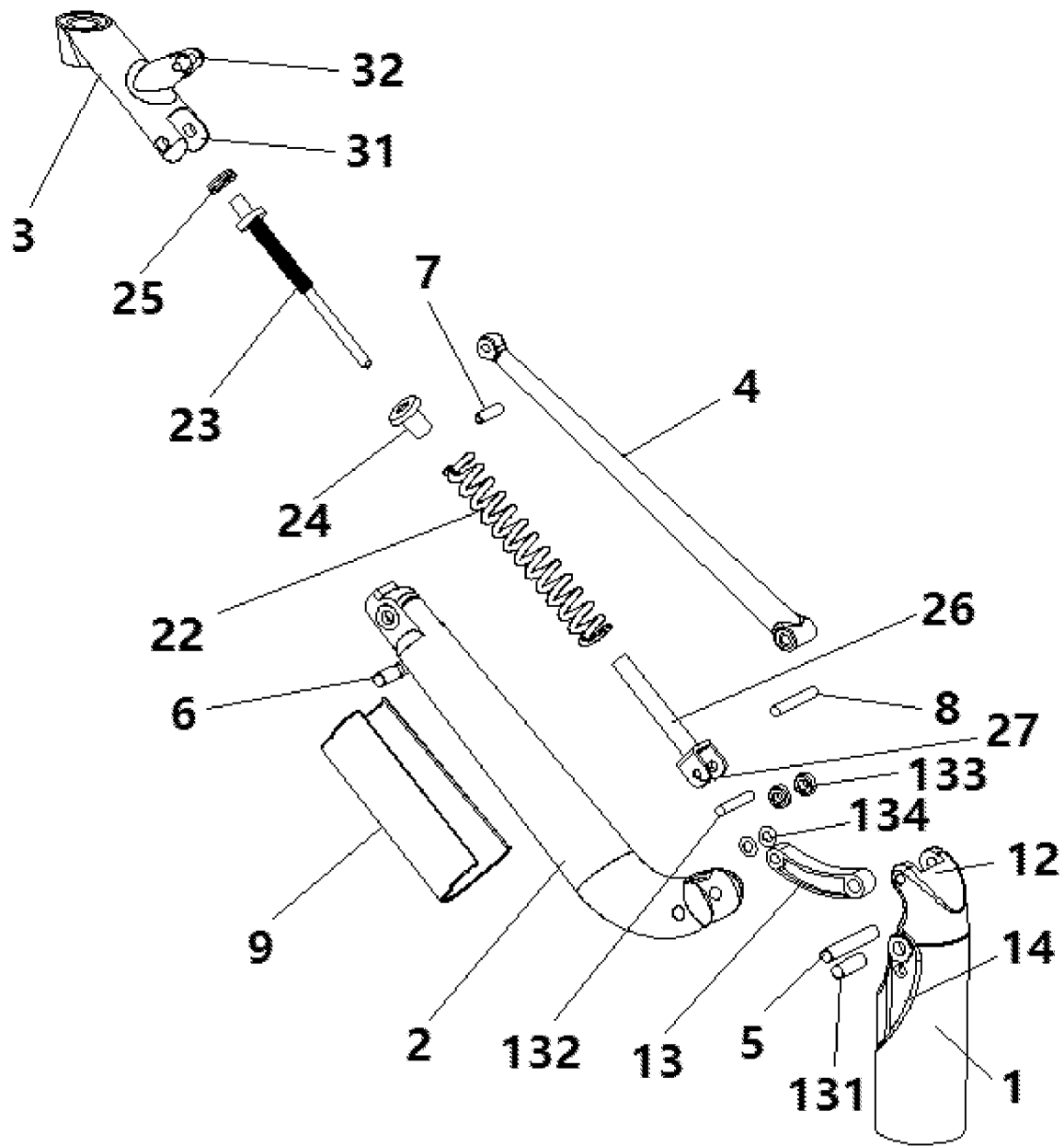
FIG. 5 is an exploded view of the embodiment of the application.
Figure 6:
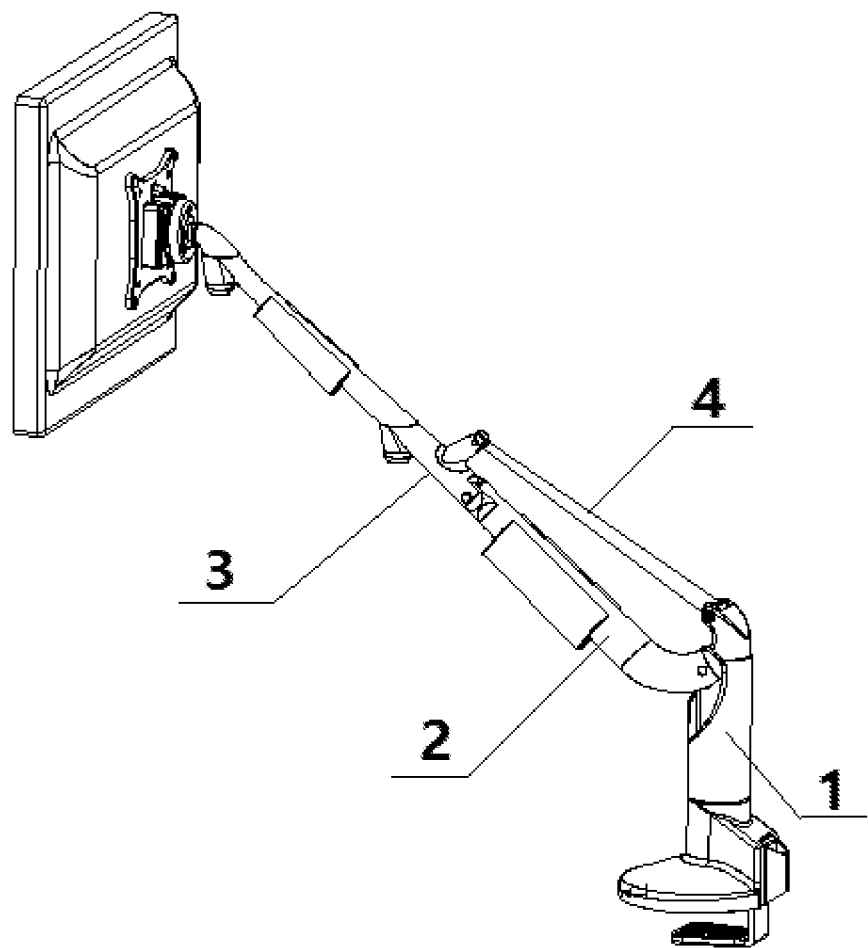
FIG. 6 is a schematic diagram of the embodiment in use state.
Figure 7:
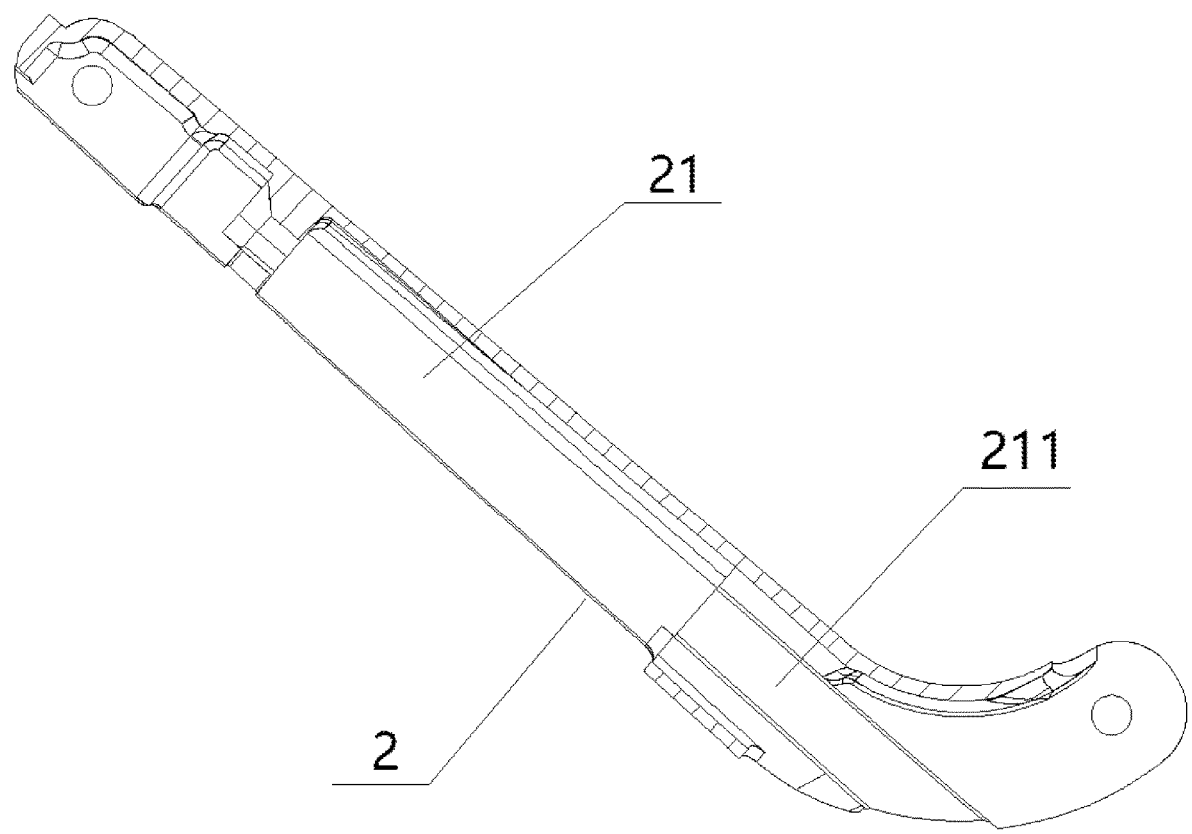
FIG. 7 is a section view of a big supporting arm in the embodiment of the application.

Wherein: 1 upright column; 11. connection part between upright column and big supporting arm; 12 connection part between upright column and supporting arm brace rod; 13 connecting rod; 131 fifth pin shaft; 132 sixth pin shaft; 133 balls; 134 gaskets; 14 step for avoidance; 2 big supporting arm; 20 spring assembly; 21 cavity; 210 contact point between spring assembly and cavity; 211 chute; 22 spring; 23 adjusting screw; 230 adjusting end of adjusting screw; 2301 hexagon socket structure; 2302 adjusting end step; 231 threaded section of adjusting screw; 232 smooth section of adjusting screw; 24 adjusting nut; 25 end face bearing; 26 spring support; 27 connecting rod seat; 28 adjusting window; 29 adjusting hole; 3 medium supporting arm; 31 connection part between medium supporting arm and big supporting arm; 32 connection part between medium supporting arm and supporting arm brace rod; 4 supporting arm brace rod; 5 first pin shaft; 6 second pin shaft; 7 third pin shaft; 8 fourth pin shaft; 9 tube for holding wires; 10 parallelogram four-bar linkage.

DETAILED DESCRIPTION

The concept, specific structure and technical effect of the application will be further described by reference to the accompanied drawings, so as to fully understand the purpose, features and effect of the application.

As shown in FIG. 1-FIG. 6, a spring adjustment supporting arm for display support comprises an upright column 1, a big supporting arm 2, a medium supporting arm 3 and a supporting arm brace rod 4, wherein the upright column 1, the big supporting arm 2, the medium supporting arm 3 and the supporting arm brace rod 4 are hinged to form a four-bar linkage; the upright column 1 is provided with a connection part between the upright column and the supporting arm brace rod 12 as well as a connection part between the upright column and the big supporting arm, and the medium supporting arm 3 is provided with a connection part between the medium supporting arm and the supporting arm brace rod 32 and a connection part between the medium supporting arm and the big supporting arm 31; one end of the supporting arm brace rod 4 is pin-jointed to the connection part between the upright column and the supporting arm brace rod 12 through a fourth pin shaft 8, the other end thereof is pin jointed to the connection part between the medium supporting arm and the supporting arm brace rod 32 through a third pin shaft 7; the front end of the big supporting arm 2 is pin jointed to the connection part between the medium supporting arm and the big supporting arm 31 through a second pin shaft 6, and the rear end thereof is pin jointed to the connection part between the upright column and the big supporting arm 11 through a first pin shaft 5. The surface of upright column 1 is provided with a step for avoidance 14 to avoid interference when the big supporting arm 2 is pressed down.

Four lines formed by sequentially connecting the connection point between the big supporting arm 2 and the upright column 1 (i.e. the first pin shaft 5), the connection point between the big supporting arm 2 and the medium supporting arm 3 (i.e. the second pin shaft 6), the connection point between the supporting arm brace rod 4 and the medium supporting arm 3 (i.e. the third pin shaft 7), and the connection point between the supporting arm brace rod 4 and the upright column 1 (i.e. the fourth pin shaft 8) form a parallelogram four-bar linkage 10.

An adjusting window 28 is arranged at the front part of the bottom of the big supporting arm 2, the big supporting arm 2 is internally provided with a cavity 21, an adjusting hole 29 is arranged at the top of the cavity 21, the inner opening of the adjusting hole 29 is communicated with the cavity 21, and the outer opening thereof is communicated with the adjusting window 28; and the cavity 21 is internally provided with a spring assembly 20. The spring assembly 20 comprises a spring pressing mechanism, a spring 22, and a spring fixing mechanism.

In this embodiment, the spring pressing mechanism comprises an adjusting screw 23 and an adjusting nut 24; the adjusting screw 23 has an adjusting end 230 with an inner hexagonal structure 2301, an adjusting end step 2302 is arranged below the adjusting end 230 sleeved in the adjusting hole 29, the adjusting end step 2302 is provided with an end face bearing 25, the end face bearing 25 abuts against the top wall of the cavity 21 around the inner opening of the adjusting hole 29; the adjusting screw 23 comprises a threaded section 231 and a smooth section 232, and the threaded section 231 is provided with external threads; the adjusting nut 24 is sleeved outside the adjusting screw 23 through threaded connection, and the front end of the spring 22 is sleeved on the adjusting screw 23 below the adjusting nut 24. The end face bearing contains balls. The end face bearing 25 arranged between the adjusting end step 2302 and the top wall of the cavity 21 can reduce the friction force therebetween when the adjusting screw 23 rotates, thus making the adjusting operation more labor-saving.

In this example, the spring fixing mechanism is a spring support 26, one end of the spring support 26 is provided with a connecting rod seat 27, the spring support 26 is hollow and tubular, the sum of the lengths of the adjusting screw 23 and the spring support 26 is larger than the maximum length when the spring 22 is completely relaxed, the outer diameter of the smooth section 232 of the adjusting screw is smaller than the hollow inner diameter of the spring support 26, and the outer diameter of the bottom end of the threaded section 231 of the adjusting screw is larger than the hollow inner diameter of the spring support 26; the length of the smooth section 232 of the adjusting screw is smaller that of the spring support 26. The rear end of the spring 22 is sleeved on the spring support 26 and abuts against the connecting rod seat 27, and the smooth section 232 of the adjusting screw 23 is sleeved inside the spring support 26 to form a spring guide shaft which completely penetrates through the inside of the spring 22.

The adjusting screw 23 and the spring support 26 are sleeved into a complete spring guide shaft supported inside the spring 22, so as to prevent the spring 22 from being distorted in compression and adjustment. Certainly, in some other examples, when the adjusting screw 23 and the spring support 26 are not sleeved into an integral spring guide shaft, the technical purpose of the application can also be realized.

When the supporting arm is pressed down and swings to adjust the height of the display, the parallelogram four-bar linkage 10 formed by hinging the upright column 1, the big supporting arm 2, the medium supporting arm 3 and the supporting arm brace rod 4 is deformed, and the spring 22 slides down and is compressed accordingly. Then, since the outer diameter of the bottom end of the threaded section 231 of the adjusting screw is larger than the hollow inner diameter of the spring support 26, the bottom end of the threaded section 231 of the adjusting screw abuts against the top end of the spring support 26 when the supporting arm presses down to a certain extent, thus playing a limiting role. Now, the supporting arm cannot be pressed down any longer.

The connecting rod seat 27 is pin-jointed to one end of the connecting rod 13 through the sixth pin shaft 132, and the other end of the connecting rod 13 is pin jointed to the upright column 1 through the fifth pin shaft 131. Both sides of the sixth pin shaft 132 are respectively provided with a ball 133 and a gasket 134. The gasket has the silencing effect.

In this example, the inner walls on both side of the lower part of the cavity 21 of the big supporting arm 2 are respectively provided with a chute 211 matching the ball 133, and the chute 211 is parallel to the axis of the big supporting arm 2, i.e., the included angle between the center line of the chute 211 and the axis of the big supporting arm 2 is 0°. When the supporting arm is swinging, the sixth pin shaft 132 slides along the ball 133 in the chute 211. Certainly, in some other examples, a guide rail can be arranged on the inner wall of the lower part of the cavity 21 of the big supporting arm 2, a groove is arranged on both sides of the sixth pin shaft 132 respectively, and the guide rail matches the groove. When the supporting arm is swinging, the sixth pin shaft 132 slides along the groove on the guide rail on the inner wall of the big supporting arm 2.

When the supporting arm is in the highest position, the spring assembly 20 reaches its maximum length. When the supporting arm is pressed down, the spring assembly will be compressed as the parallelogram is deformed. However, the greater the compression degree of the spring is, the greater the accumulated elastic potential energy is. When the elastic potential energy exceeds the gravity potential energy of the display, the spring assembly will rebound and stretch, making the supporting arm unable to hover in a low position.

In the prior art, to avoiding the supporting arm cannot hover at a low position, which requires high performance of the spring, i.e. the spring shall accurately match the weight of the display. Therefore, the selection range of the spring and the weight range of the display that can be supported are relatively narrow, which certainly limits the design and production of the supporting arm product. In this application, a sliding mechanism is arranged at the hinge point (i.e., the sixth pin shaft 132) between the spring assembly 20 and the connecting rod 13. When the supporting arm is pressed down to compress the spring assembly, the sliding mechanism slides the connecting rod 13 toward the depth of the big supporting arm 2, which substantially reduces the degree of compression of the spring assembly 20, and keeps the elastic potential energy accumulated by the spring assembly in balance with the gravitational potential energy of the display. Then, the supporting arm can hover at any desired position without requiring strict selection of springs.

In this example, the chute is parallel to the axis of the big supporting arm 2. In other examples, the center line of the chute or the guide rail may form a certain included angle with the axis of the big supporting arm, which is preferably 0-5°. Of course, a larger angle is not completely impossible. However, the big supporting arm is required to be bulkier when the angle is too large, resulting in poor esthetic appeal or poor usage experience.

Figure 8:
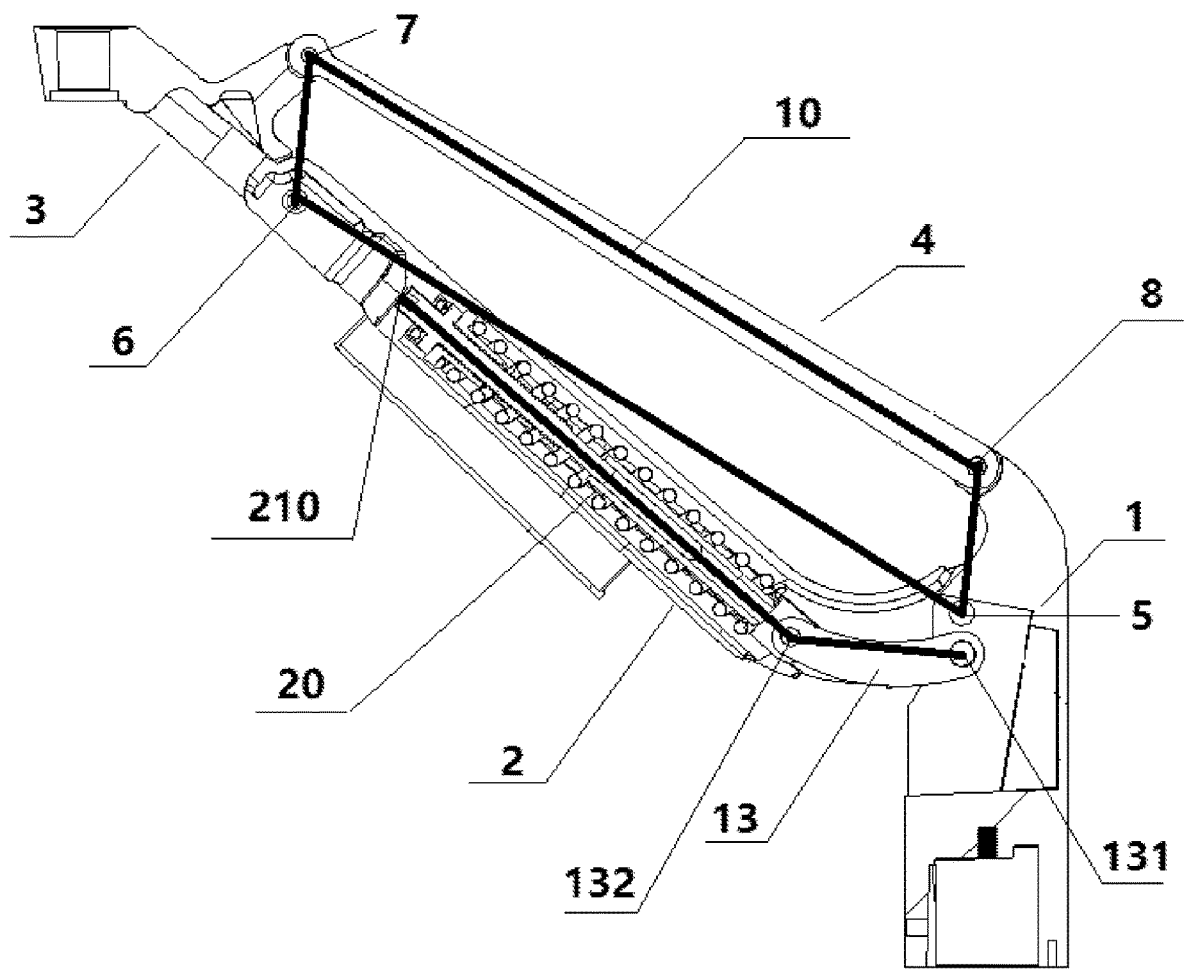
FIG. 8 is an arrangement diagram of a four-bar linkage and a spring assembly in the embodiment of the application.

As shown in FIG. 8, the contact point 210 of the spring assembly 20 and the cavity 21, the hinge point of the spring assembly and the connecting rod 13 (i.e., the sixth pin shaft 132), and the hinge point of the connecting rod 13 and the upright column 1 (i.e., the fifth pin shaft 131) are all located outside the range of parallelogram four-bar linkage 10.

Figure 9:
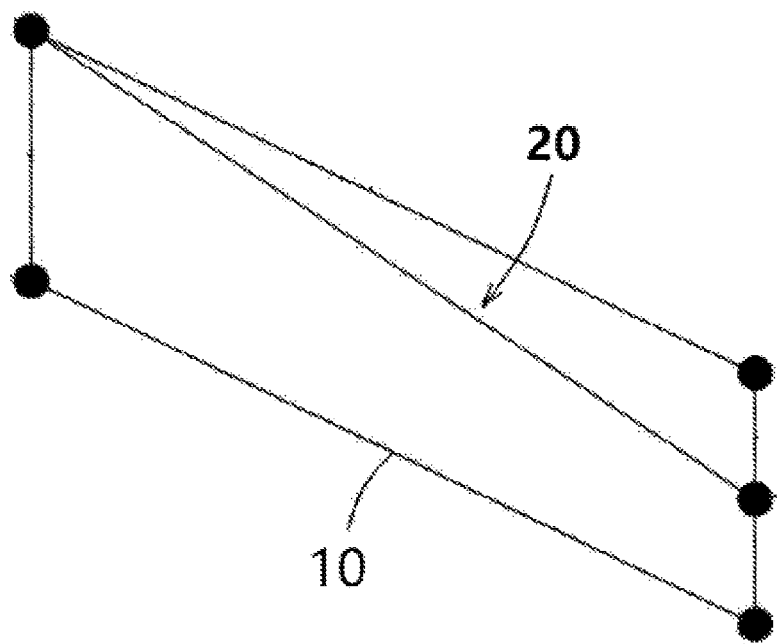
FIG. 9 is an arrangement diagram of a four-bar linkage and a spring assembly in the prior art.

In the prior art, the parallelogram four-bar linkage 10 and the spring assembly 20 are arranged as shown in FIG. 9, and the spring assembly 20 is arranged in the parallelogram four-bar linkage 10. In order to ensure sufficient space for the spring assembly 20 and provide a certain adjustment space, the area of the parallelogram four-bar linkage 10 must be large enough, and its two long sides are usually enclosed into a cavity to accommodate the spring assembly (big supporting arm 2 and supporting arm brace rod 4 in this application). As a result, the whole supporting arm is bulky and heavy, and difficult to move.

In the application, as shown in FIG. 8, the spring assembly 20 is arranged outside the parallelogram four-bar linkage 10 to obtain the small area of the parallelogram four-bar linkage 10, the cavity 21 for accommodating the spring assembly 20 is arranged inside the big supporting arm 2, and the other long-side supporting arm brace rod 4 of the parallelogram four-bar linkage 10 is of a rod-shaped structure only. Thus, the whole supporting arm has small volume, exquisite and beautiful appearance, and is light and convenient to move.

In the prior art, a gas spring is mostly used as a force storage mechanism. In view of constant elastic force of the gas spring, when the display support is intended to support displays with different weights, the force arm included angle of the gas spring should be adjusted for adapting to these displays. Therefore, a force arm included angle adjustment mechanism is required. In this case, an adjusting block and an adjusting bolt are arranged in an upright column, and the force arm included angle of the gas spring is covered by moving the adjusting block up and down on the adjusting bolt so as to adapt to displays with different weights, which will lead to complicated internal structure of the column and large production and installation tolerances. In contrast, when the display support adopting the supporting arm of the application is used for supporting displays with different weights, the gas spring assembly is replaced by the mechanical spring assembly as the force storage mechanism of the elastic supporting mechanism, which allows the elastic potential energy of the mechanical spring to be adjusted through the compression degree of the spring. Then, the larger the elastic potential energy of the spring is, the larger the weight of the display that it can bear. Therefore, when a heavy display is supported by the display support, only the spring compression mechanism should be adjusted to press the spring downward more tightly. So, it is not necessary to adjust the force arm included angle of the spring assembly, nor provide a force arm included angle adjustment mechanism in the upright column, thus simplifying the mechanism of the supporting arm. As mentioned above, compared with the prior art, the connecting rod 13 and the upright column 1 are directly pin-jointed through the fifth pin shaft 131 in the application, thus simplifying the structure, making the production and installation easier and reducing the production cost.

A tube for holding wires 9 is arranged under the big supporting arm 2 for taking various cables. In this embodiment, the tube for holding wires 9 is clamped under the big supporting arm 2.

In use, according to the weight of the display, a user screws the adjusting end of the adjusting screw and rotates the adjusting screw by means of an adjusting wrench, through the adjusting window arranged at the front part of the bottom surface of the big supporting arm, and based on an inner hexagonal structure of the adjusting end of the adjusting screw exposed in the adjusting window through the adjusting hole. The adjusting nut can move along the adjusting screw. In particular, the adjusting nut moves down to compress the spring; otherwise, the spring is loosened, so as to keep the tension of the spring to match the weight of the display. That is, when the display is loaded on the support, the support can maintain a stable hovering state, and the tension of the spring is adapted to the weight of the display whether the display is lifted up or pressed down to a certain height.

The preferred embodiment of the application has been described in detail above. It should be understood that those skilled in the art can make various modifications and changes according to the concept of the application without creative labor. Therefore, any technical scheme that can be obtained by those skilled in the technical art through logical analysis, reasoning or limited experiments on the basis of the prior art and the concept of the application should be within the scope of protection determined by the claims.

What is claimed is:

1. A spring adjustment supporting arm for a display support, comprising an upright column, a first supporting arm, a second supporting arm, a supporting arm brace rod, and a connecting rod, wherein the upright column, the first supporting arm, the second supporting arm and the supporting arm brace rod are hinged to form a four-bar linkage, the first supporting arm is internally provided with a cavity; the cavity is internally provided with a spring assembly, one end of the spring assembly abuts against top of the cavity, and another end thereof is hinged to the upright column by means of the connecting rod;

wherein four lines sequentially connected by a connection point between the supporting arm brace rod and the upright column, a connection point between the supporting arm brace rod and the second supporting arm, a connection point between the first supporting arm and the second supporting arm, and a connection point between the first supporting arm and the upright column form a parallelogram;

wherein the spring assembly comprises a spring pressing mechanism, a spring and a spring fixing mechanism; one end of the spring pressing mechanism abuts against top of the cavity, and another end thereof presses front end of the spring towards the spring fixing mechanism; the spring fixing mechanism is arranged at rear end of the spring, the rear end of the spring is fixed to the spring fixing mechanism, and the spring fixing mechanism is hinged and fixed to the upright column through a connecting rod;

wherein an adjusting window is arranged at front part of bottom of the first supporting arm, an adjusting hole is arranged at top of the cavity, an inner opening of the adjusting hole is communicated with the cavity, and an outer opening thereof is communicated with the adjusting window; the spring pressing mechanism comprises an adjusting screw and an adjusting nut; the adjusting screw has an adjusting end with an inner hexagonal structure, an adjusting end step is arranged below the adjusting end sleeved in the adjusting hole, and abuts against top wall of the cavity around the inner opening of the adjusting hole; the adjusting screw is provided with external threads, the adjusting nut is sleeved outside the adjusting screw through threaded connection, and front end of the spring is sleeved on the adjusting screw below the adjusting nut the spring fixing mechanism is a spring support, one end of the spring support is provided with a connecting rod seat, rear end of the spring is sleeved on the spring support and abuts against the connecting rod seat, the connecting rod seat is pin-jointed to one end of the connecting rod, and another end of the connecting rod is pin jointed to the upright column; and wherein a ball is respectively arranged on a pin shaft on both sides at a connection of the connecting rod seat and the connecting rod, and inner walls on both sides of the first supporting arm are respectively provided with a chute, and the ball is matched with the chute, thus enabling the connection of the connecting rod seat and the connecting rod to slide along the inner wall of the first supporting arm when the supporting arm is swinging.

2. The spring adjustment supporting arm for a display support according to claim 1, wherein the spring support is hollow and tubular, outer diameter of the adjusting screw is smaller than inner diameter of the spring support, sum of lengths of the adjusting screw and the spring support is larger than maximum length when the spring is completely relaxed, and lower end of the adjusting screw is sleeved inside the spring support to form a spring guide shaft which completely passes through the spring.

3. The spring adjustment supporting arm for a display support according to claim 2, wherein the adjusting screw comprises a threaded section and a smooth section, wherein the threaded section is provided with external threads; outer diameter of the smooth section of the adjusting screw is smaller than inner diameter of the spring support, and outer diameter of bottom end of the threaded section of the adjusting screw is larger than inner diameter of the spring support; length of the smooth section of the adjusting screw is smaller than that of the spring support; the smooth section of the adjusting screw is sleeved inside the spring support to form a spring guide shaft which completely passes through inside of the spring.

4. The spring adjustment supporting arm for a display support according to claim 3, wherein an end face bearing is further arranged between the adjusting end step and top wall of the cavity.

5. The spring adjustment supporting arm for a display support according to claim 1, wherein the upright column is provided with a connection part between the upright column and the supporting arm brace rod and a connection part between the upright column and the first supporting arm, and the second supporting arm is provided with a connection part between the second supporting arm and the supporting arm brace rod and a connection part between the second supporting arm and the first supporting arm; one end of the supporting arm brace rod is pin-jointed to the connection part between the upright column and the supporting arm brace rod, and another end thereof is pin-jointed to the connection part between the second supporting arm and the supporting arm brace rod; front end of the first supporting arm is pin-jointed to the connection part between the second supporting arm and the first supporting arm, and rear end of thereof is pin-jointed to the connection part between the upright column and the first supporting arm.

6. The spring adjustment supporting arm for a display support according to claim 1, wherein a tube for holding wires is arranged under the first supporting arm.

7. The spring adjustment supporting arm for a display support according to claim 4, wherein a tube for holding wires is arranged under the first supporting arm.

8. The spring adjustment supporting arm for a display support according to claim 1, wherein a step for avoidance is arranged on surface of the upright column.

9. The spring adjustment supporting arm for a display support according to claim 4, wherein a step for avoidance is arranged on surface of the upright column.

10. The spring adjustment supporting arm for a display support according to claim 1, wherein a contact point between one end of the spring assembly and top of the cavity, a hinge point of another end of thereof and the connecting rod, and a hinge point of the connecting rod and the upright column are all located outside the parallelogram.

11. The spring adjustment supporting arm for a display support according to claim 10, wherein a sliding mechanism is arranged between the hinge point of the spring assembly and the connecting rod and inner wall of the first supporting arm, so that the hinge point of the spring assembly and the connecting rod slides along the inner wall of the first supporting arm when the supporting arm is swinging.

12. A spring adjustment supporting arm for a display support, comprising an upright column, a first supporting arm, a second supporting arm, a supporting arm brace rod, and a connecting rod, wherein the upright column, the first supporting arm, the second supporting arm and the supporting arm brace rod are hinged to form a four-bar linkage, the first supporting arm is internally provided with a cavity; the cavity is internally provided with a spring assembly, one end of the spring assembly abuts against top of the cavity, and another end thereof is hinged to the upright column by means of the connecting rod;

wherein four lines sequentially connected by a connection point between the supporting arm brace rod and the upright column, a connection point between the supporting arm brace rod and the second supporting arm, a connection point between the first supporting arm and the second supporting arm, and a connection point between the first supporting arm and the upright column form a parallelogram;

wherein a contact point between one end of the spring assembly and top of the cavity, a hinge point of another end of thereof and the connecting rod, and a hinge point of the connecting rod and the upright column are all located outside the parallelogram;

wherein a sliding mechanism is arranged between the hinge point of the spring assembly and the connecting rod and inner wall of the first supporting arm, so that the hinge point of the spring assembly and the connecting rod slides along the inner wall of the first supporting arm when the supporting arm is swinging, wherein the sliding mechanism comprises a chute arranged on the inner wall of the first supporting arm and balls arranged at the hinge point of the spring assembly and the connecting rod, the chute is matched with the balls to enable the hinge point of the spring assembly and the connecting rod to slide along the inner wall of the first supporting arm when the supporting arm is swinging.

13. The spring adjustment supporting arm for a display support according to claim 12, wherein an included angle between a center line of the chute and an axis of the first supporting arm is 0-5°.

14. A spring adjustment supporting arm for a display support, comprising an upright column, a first supporting arm, a second supporting arm, a supporting arm brace rod, and a connecting rod, wherein the upright column, the first supporting arm, the second supporting arm and the supporting arm brace rod are hinged to form a four-bar linkage, the first supporting arm is internally provided with a cavity; the cavity is internally provided with a spring assembly, one end of the spring assembly abuts against top of the cavity, and another end thereof is hinged to the upright column by means of the connecting rod;

wherein four lines sequentially connected by a connection point between the supporting arm brace rod and the upright column, a connection point between the supporting arm brace rod and the second supporting arm, a connection point between the first supporting arm and the second supporting arm, and a connection point between the first supporting arm and the upright column form a parallelogram;

wherein a contact point between one end of the spring assembly and top of the cavity, a hinge point of another end of thereof and the connecting rod, and a hinge point of the connecting rod and the upright column are all located outside the parallelogram;

wherein a sliding mechanism is arranged between the hinge point of the spring assembly and the connecting rod and inner wall of the first supporting arm, so that the hinge point of the spring assembly and the connecting rod slides along the inner wall of the first supporting arm when the supporting arm is swinging, wherein the sliding mechanism comprises a guide rail arranged on the inner wall of the first supporting arm and a groove arranged at the hinge point of the spring assembly and the connecting rod, the guide rail is matched with the groove to enable the hinge point of the spring assembly and the connecting rod to slide along the inner wall of the first supporting arm when the supporting arm is swinging.

15. The spring adjustment supporting arm for a display support according to claim 14, wherein an included angle between a center line of the guide rail and an axis of the first supporting arm is 0-5°.

16. The spring adjustment supporting arm for a display support according to claim 1, wherein an included angle between a center line of the chute and an axis of the first supporting arm is 0-5°.

* * * * *